United States Patent
Won et al.

(10) Patent No.: US 10,928,954 B2
(45) Date of Patent: Feb. 23, 2021

(54) TOUCH SENSOR AND DISPLAY DEVICE INCLUDING THE SAME

(71) Applicant: SAMSUNG DISPLAY CO., LTD., Yongin-si (KR)

(72) Inventors: Byeong Hee Won, Yongin-si (KR); Il Nam Kim, Yongin-si (KR); Jae Kyoung Kim, Yongin-si (KR); Jong In Baek, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 50 days.

(21) Appl. No.: 15/827,054

(22) Filed: Nov. 30, 2017

(65) Prior Publication Data
US 2018/0210603 A1    Jul. 26, 2018

(30) Foreign Application Priority Data
Jan. 24, 2017 (KR) .................. 10-2017-0011084

(51) Int. Cl.
*G06F 3/041* (2006.01)
*G06K 9/00* (2006.01)
*G06F 3/044* (2006.01)

(52) U.S. Cl.
CPC ...... *G06F 3/041661* (2019.05); *G06F 3/0446* (2019.05); *G06K 9/0002* (2013.01); *G06F 2203/04106* (2013.01)

(58) Field of Classification Search
CPC ...... G06F 3/0416; G06F 3/0412; G06F 3/044; G06K 9/0002; G06K 9/00053; G06K 9/00013; G01B 7/004

USPC .................................................. 345/174
See application file for complete search history.

(56) References Cited

U.S. PATENT DOCUMENTS

| | | | | |
|---|---|---|---|---|
| 5,940,526 | A * | 8/1999 | Setlak | G06K 9/0002 382/124 |
| 6,060,756 | A * | 5/2000 | Machida | G01B 7/004 257/414 |
| 9,679,185 | B2 * | 6/2017 | Chin | G06K 9/0002 |
| 2002/0000915 | A1 * | 1/2002 | Lee | G06K 9/0002 340/540 |
| 2003/0190061 | A1 * | 10/2003 | Chou | G06K 9/0002 382/124 |
| 2008/0278467 | A1 | 11/2008 | Hwang et al. | |
| 2011/0063233 | A1 * | 3/2011 | Chuang | G06F 3/0416 345/173 |

(Continued)

FOREIGN PATENT DOCUMENTS

| KR | 101493276 B1 | 2/2015 |
|---|---|---|
| KR | 1020150073539 A | 7/2015 |

(Continued)

*Primary Examiner* — Fred Tzeng
(74) *Attorney, Agent, or Firm* — Cantor Colburn LLP

(57) ABSTRACT

A touch sensor includes sensor pixels which provide output currents which change in response to a touch made by a user, a sensor scan driver coupled to the sensor pixels through sensor scan lines and supplies sensor scan signals to the sensor pixels, and a read-out circuit coupled to the sensor pixels through output lines, and senses a touch using the output currents. The sensor scan driver changes a scheme for supplying the sensor scan signals depending on a fingerprint sensing mode and a touch sensing mode.

16 Claims, 12 Drawing Sheets

(56) References Cited

U.S. PATENT DOCUMENTS

| | | | |
|---|---|---|---|
| 2011/0316809 A1* | 12/2011 | Kim | G06F 3/0412 345/174 |
| 2012/0056663 A1* | 3/2012 | Oh | G06F 3/0412 327/517 |
| 2013/0287274 A1* | 10/2013 | Shi | G06F 3/044 382/124 |
| 2015/0177884 A1 | 6/2015 | Han | |
| 2016/0034739 A1* | 2/2016 | Chin | G06K 9/0002 382/124 |
| 2016/0042216 A1* | 2/2016 | Yang | G06K 9/0002 382/124 |
| 2016/0055363 A1* | 2/2016 | Lee | G06K 9/0002 382/124 |
| 2016/0063295 A1 | 3/2016 | Kim et al. | |
| 2016/0098140 A1* | 4/2016 | Lee | G06F 3/0416 345/173 |
| 2016/0132177 A1* | 5/2016 | Bae | G06K 9/00013 345/174 |
| 2016/0132713 A1 | 5/2016 | Bae et al. | |
| 2016/0148036 A1* | 5/2016 | Kim | G06K 9/0002 382/124 |
| 2016/0239700 A1* | 8/2016 | Yang | G06K 9/0002 |
| 2016/0309104 A1* | 10/2016 | Peng | H04N 5/32 |
| 2016/0314332 A1* | 10/2016 | Lee | G06K 9/0002 |
| 2016/0350577 A1* | 12/2016 | Yang | G06K 9/00053 |

FOREIGN PATENT DOCUMENTS

| | | |
|---|---|---|
| KR | 1020160026300 A | 3/2016 |
| KR | 1020160057324 A | 5/2016 |

\* cited by examiner

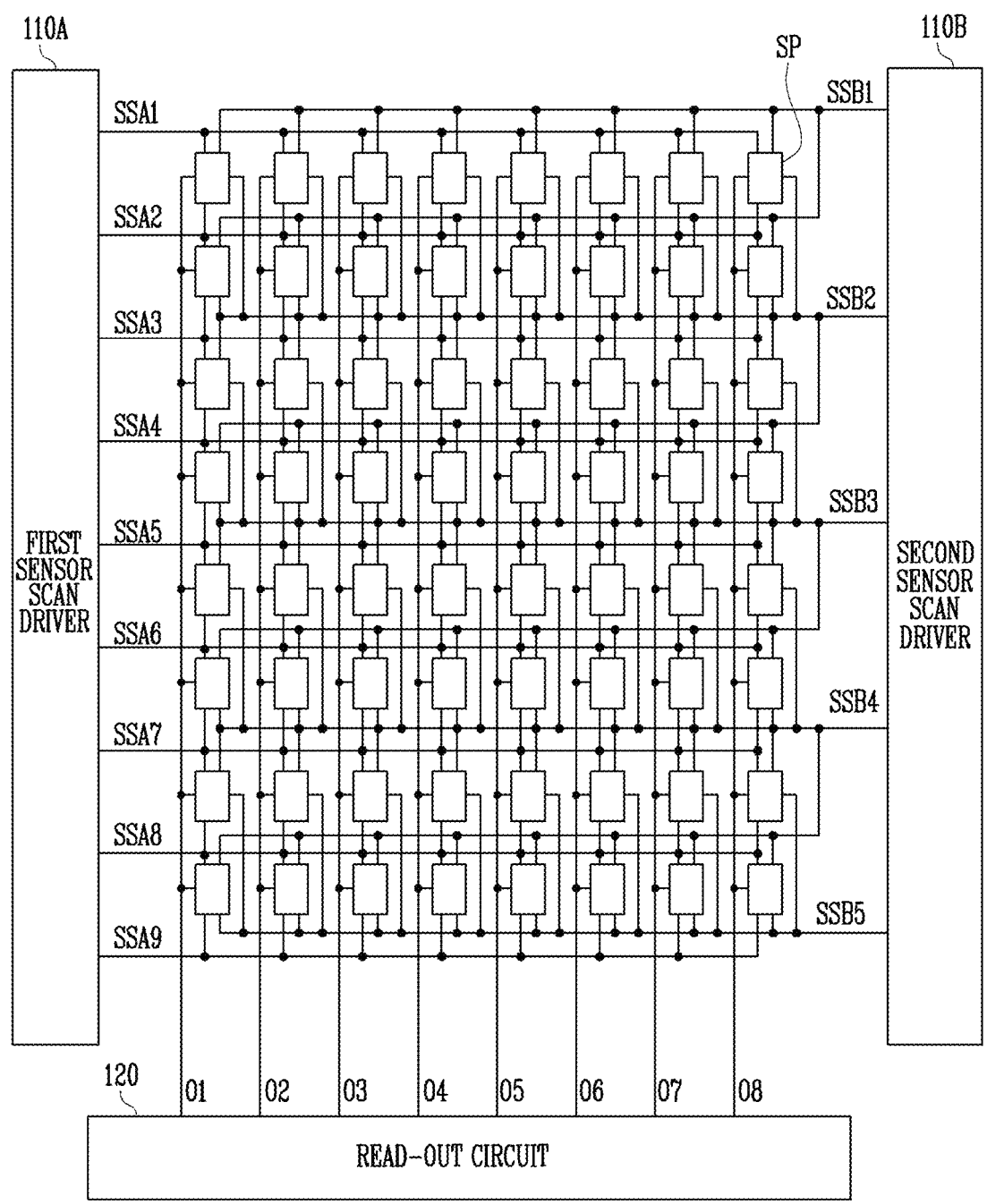

TOUCH SENSOR AND DISPLAY DEVICE INCLUDING THE SAME

The application claims priority to Korean patent application No. 10-2017-0011084 filed on Jan. 24, 2017, and all the benefits accruing therefrom under 35 U.S.C. § 119, the content of which in its entirety is herein incorporated by reference.

BACKGROUND

1. Field

Various exemplary embodiments of the invention relate to a touch sensor and a display device including the touch sensor.

2. Description of the Related Art

As schemes for implementing touch sensors, various recognition schemes such as an optical scheme, a thermal-sensing scheme, and a capacitive scheme are widely known. A capacitive touch sensor based on the capacitive scheme, among the schemes, determines a touch location by detecting a point where capacitance changes depending on a touch of a human hand or an object. The capacitive touch sensor has recently been widely used because multi-touch detection is facilitated, and a precision of detection is excellent.

Recently, a fingerprint and touch pressure, as well as a touch location, may also be detected using a touch sensor, so that various functions may be provided to users.

A capacitive fingerprint sensor may acquire a shape of a fingerprint (e.g., a fingerprint pattern) by detecting a change in capacitance depending on shapes of valleys and ridges of the fingerprint when a human finger approaches a conductive sensing electrode.

SUMMARY

Various exemplary embodiments of the invention are directed to a touch sensor and a display device including the touch sensor, which can sense either a fingerprint or a touch location using sensor pixels without using a separate fingerprint sensor or touch sensor.

An exemplary embodiment of the invention may provide for a touch sensor. The touch sensor may include sensor pixels which provide output currents that change in response to a touch made by a user, a sensor scan driver which is coupled to the sensor pixels through sensor scan lines and supplies sensor scan signals to the sensor pixels, and a read-out circuit which is coupled to the sensor pixels through output lines, and senses the touch using the output currents, where the sensor scan driver changes a scheme for supplying the sensor scan signals depending on a fingerprint sensing mode and a touch sensing mode.

In an exemplary embodiment, the sensor scan driver may include a first sensor scan driver and a second sensor scan driver, the first sensor scan driver may supply first sensor scan signals of the sensor scan signals to the sensor pixels in the fingerprint sensing mode, and the second sensor scan driver may supply second sensor scan signals of the sensor scan signals to the sensor pixels in the touch sensing mode.

In an exemplary embodiment, the first sensor scan driver may sequentially supply the first sensor scan signals to respective sensor pixel rows of the sensor pixels.

In an exemplary embodiment, the second sensor scan driver may simultaneously supply the second sensor scan signals to at least two of the sensor pixel rows of the sensor pixels.

In an exemplary embodiment, a first period during which the fingerprint sensing mode is maintained is shorter than a second period during which the touch sensing mode is maintained.

In an exemplary embodiment, a first period during which the fingerprint sensing mode is maintained and a second period during which the touch sensing mode is maintained may be alternately repeated.

In an exemplary embodiment, the read-out circuit may sense a fingerprint using the output currents that are sequentially provided from the output lines in the fingerprint sensing mode.

In an exemplary embodiment, the read-out circuit may sense a touch location using a part of the output currents that are sequentially provided from the output lines in the touch sensing mode.

In an exemplary embodiment, the scan driver may sequentially supply the sensor scan signals to the sensor scan lines in the fingerprint sensing mode, and supply the sensor scan signals to only a part of the sensor scan lines in the touch sensing mode.

In an exemplary embodiment, among the sensor pixels, a sensor pixel coupled to an i-th (where i is an integer of 2 or more) sensor scan line of the sensor scan lines and a j-th (where j is a natural number) output line of the output lines may include a sensor electrode, a first transistor which includes a gate electrode coupled to the sensor electrode and controls a current that is output through the j-th output line, a second transistor which includes a gate electrode coupled to the i-th sensor scan line, and is coupled between a reference voltage line and the first transistor, and a capacitor electrode which forms a first capacitor with the sensor electrode, and is coupled to the i-th sensor scan line.

In an exemplary embodiment, the sensor pixel may further include a third transistor which includes a gate electrode coupled to an i−1-th sensor scan line and is coupled between the reference voltage line and the sensor electrode.

In an exemplary embodiment, when the touch is made, the sensor electrode may form a second capacitor with a finger of the user.

In an exemplary embodiment, an output current of the output currents may have a magnitude that varies in response to a change in capacitance of the second capacitor.

In an exemplary embodiment, a gate voltage applied to the gate electrode of the first transistor may be defined by the following equation: $Vg=Vcom+\{C1/(C1+C2)\}*Vs$, where $Vg$ denotes the gate voltage, $Vcom$ denotes a reference voltage provided to the second transistor through the reference voltage line, $C1$ denotes capacitance of the first capacitor, $C2$ denotes capacitance of the second capacitor, and $Vs$ denotes a change in voltage of a sensor scan signal supplied through the i-th sensor scan line.

In an exemplary embodiment, a voltage change of each sensor scan signal supplied to the sensor pixels in the fingerprint sensing mode may have a value greater than that of a voltage change of each sensor scan signal supplied to the sensor pixels in the touch sensing mode.

An exemplary embodiment of the invention may provide for a display device. The display device may include a display panel which displays an image, and a touch sensing layer which is arranged on a first surface of the display panel and includes a touch sensor. The touch sensor may include sensor pixels which provide output currents that change in response to a touch made by a user, a sensor scan driver which is coupled to the sensor pixels through sensor scan lines and supplies sensor scan signals to the sensor pixels, and a read-out circuit which is coupled to the sensor pixels through output lines, and senses a touch using the output currents, where the sensor scan driver changes a scheme for supplying the sensor scan signals depending on a fingerprint sensing mode and a touch sensing mode.

In an exemplary embodiment, the sensor scan driver may sequentially supply the sensor scan signals to the sensor scan lines in the fingerprint sensing mode, and supply the sensor scan signals to only a part of the sensor scan lines in the touch sensing mode.

In an exemplary embodiment, the read-out circuit may sense a fingerprint using the output currents that are sequentially provided from the output lines in the fingerprint sensing mode, and sense a touch location using a part of the output currents that are sequentially provided from the output lines in the touch sensing mode.

In an exemplary embodiment, among the sensor pixels, a sensor pixel coupled to an i-th (where i is an integer of 2 or more) sensor scan line of the sensor scan lines and a j-th (where j is a natural number) output line of the output lines may include a sensor electrode, a first transistor which includes a gate electrode coupled to the sensor electrode and controls a current that is output through the j-th output line, a second transistor which includes a gate electrode coupled to the i-th sensor scan line, and is coupled between a reference voltage line and the first transistor, a capacitor electrode which forms a first capacitor with the sensor electrode, and is coupled to the i-th sensor scan line, and a third transistor which includes a gate electrode coupled to an i−1-th sensor scan line and is coupled between the reference voltage line and the sensor electrode.

In an exemplary embodiment, when the touch is made, the sensor electrode may form a second capacitor with a finger of the user, and an output current of the output currents may have a magnitude that varies in response to a change in capacitance of the second capacitor.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIGS. 8, 9, and 10 are diagrams for explaining an exemplary embodiment of a method of driving a touch sensor according to the invention;

DETAILED DESCRIPTION

Figure 1:
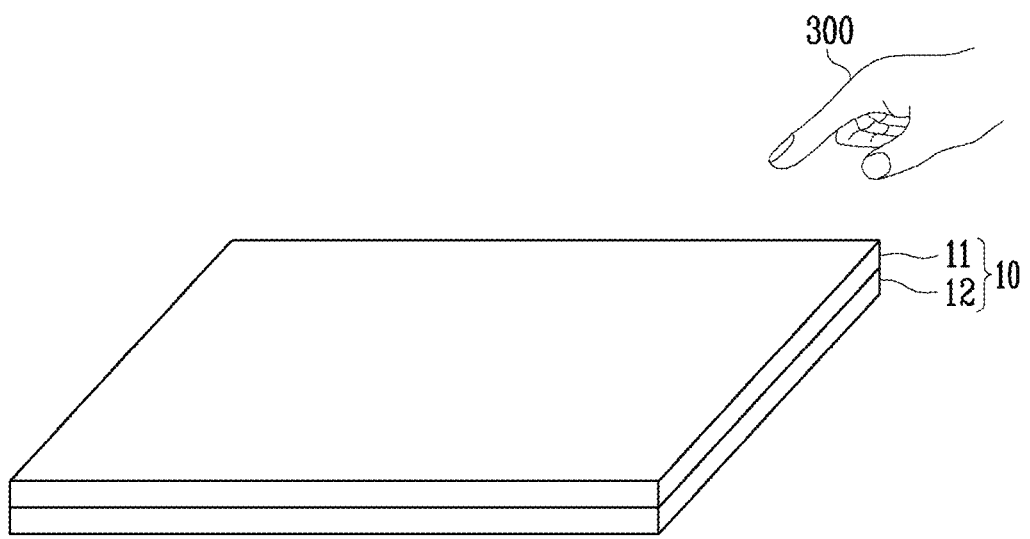
FIG. 1 is a diagram illustrating an exemplary embodiment of a display device according to the invention.

Exemplary embodiments will now be described more fully hereinafter with reference to the accompanying drawings; however, they may be embodied in different forms and should not be construed as limited to the exemplary embodiments set forth herein. Rather, these exemplary embodiments are provided so that this disclosure will be thorough and complete, and will fully convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Hereinafter, exemplary embodiments will be described with reference to the accompanying drawings. Exemplary embodiments are described herein with reference to cross-sectional illustrations that are schematic illustrations of exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a diagram illustrating a display device according to an exemplary embodiment of the invention.

Referring to FIG. 1, a display device 10 according to an exemplary embodiment of the invention may include a display panel 12 for displaying an image, and a touch sensing layer 11 disposed on one surface of the display panel 12.

The display device 10 may be provided in the shape of a rectangular plate having two pairs of parallel sides, for example. When the display device 10 is provided in the shape of a rectangular plate, the sides of any one of the two pairs may be provided to be longer than those of the other pair, but the shape of the display device is not limited thereto, and the display device may be provided in various other shapes including the shape of a circle, a rectangle having rounded corners, etc.

The display panel 12 may display arbitrary visual information, for example, text, video, a picture, a two-dimensional ("2D") image, or a three-dimensional ("3D") image on one surface thereof, where the arbitrary visual information may be displayed as an "image". The type of the display panel 12 denotes the type of image to be displayed, which is not especially limited to a specific type.

The touch sensing layer 11 may include a touch sensor for recognizing a touch event generated by a user's finger 300 or a separate input means. The touch sensor is capable of sensing a touch and/or pressure using sensing electrodes, and the type thereof is not especially limited to a specific type.

In an exemplary embodiment, the touch sensor may be implemented in a capacitive type, a piezoresistive type, or the like, for example.

Further, the touch sensor may sense either a touch location or the fingerprint of the user depending on a touch sensing mode.

Figure 2:
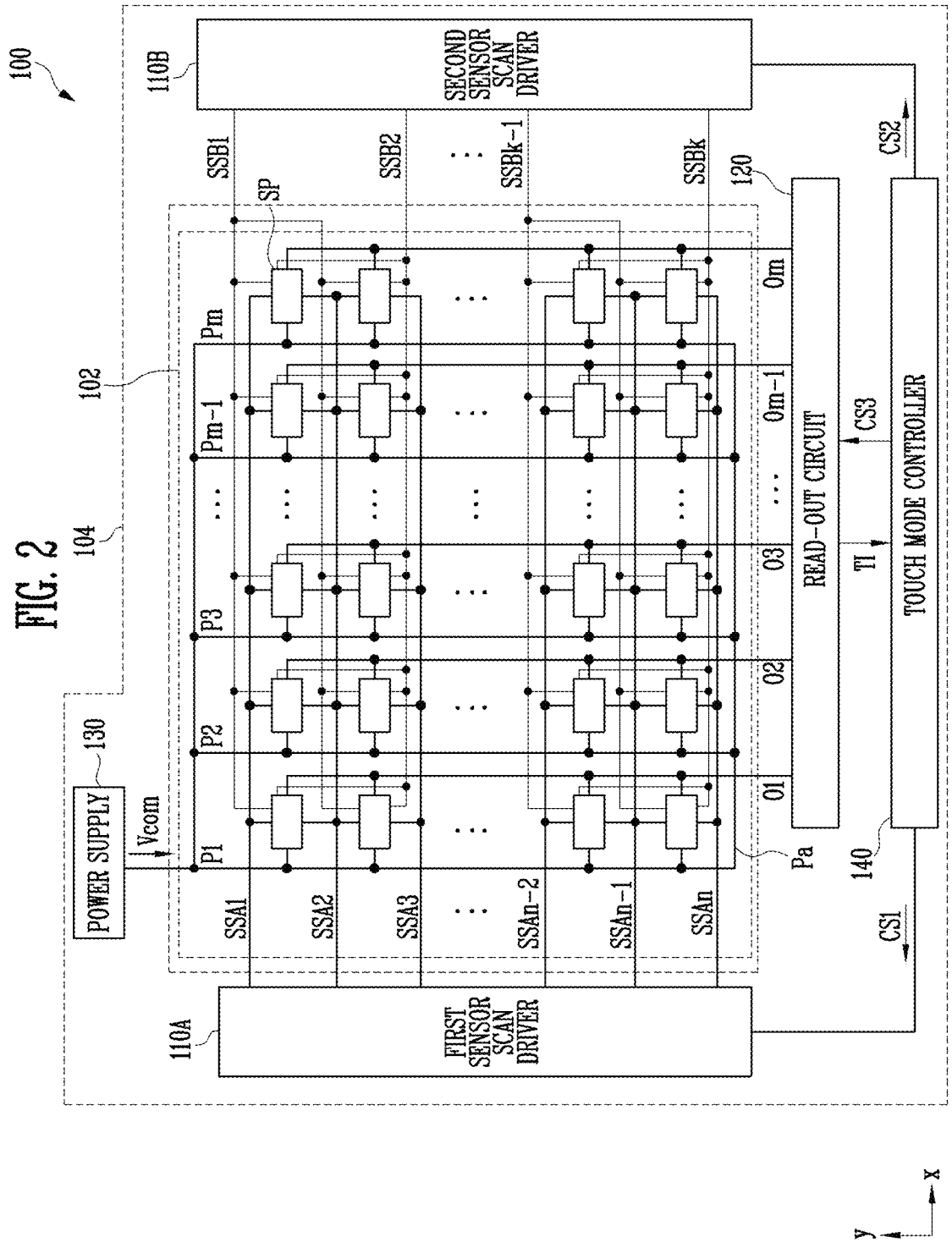
FIG. 2 is a diagram illustrating an exemplary embodiment of a touch sensor according to the invention.
Figure 3:
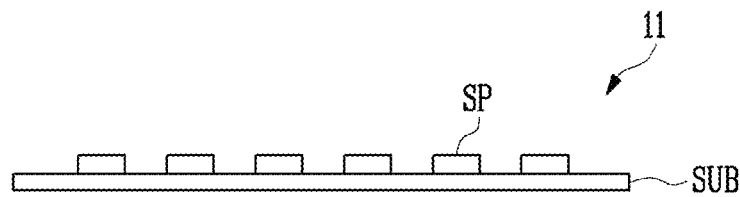
FIG. 3 is a diagram illustrating a partial section of the touch sensor illustrated in FIG. 2.

FIG. 2 is a diagram illustrating a touch sensor according to an exemplary embodiment of the invention, and FIG. 3 is a diagram illustrating a partial section of the touch sensor illustrated in FIG. 2.

Referring to FIGS. 2 and 3, a touch sensor 100 according to an exemplary embodiment of the invention may recognize a touch made by the user.

In an exemplary embodiment, a recognition operation that can be implemented by the touch sensor 100 may include at least one of the identification of a location where a touch is made, the recognition of a fingerprint of a touching finger, and the sensing of touch pressure, for example.

The touch sensor 100 may include a sensor unit 102 and a sensor driver 104.

The sensor unit 102 may include a substrate SUB and sensor pixels SP.

The substrate SUB may include an insulating material such as glass or resin. Further, the substrate SUB may include a material having flexibility so that the substrate SUB is bendable or foldable and may have a single-layer structure or a multi-layer structure.

In an exemplary embodiment, the substrate SUB may include a material including at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate, for example.

However, the material used to form the substrate SUB may be variously changed, and may also be implemented using, for example, fiberglass-reinforced plastic ("FRP") or the like.

The sensor pixels SP may be disposed on the substrate SUB. Further, the sensor pixels SP may be coupled to first-sensor scan lines SSA1 to SSAn, second-sensor scan lines SSB1 to SSBk, and output lines O1 to Om, where n, k and m are natural numbers.

The sensor pixels SP may receive first sensor scan signals through the first-sensor scan lines SSA1 to SSAn, and may receive second sensor scan signals through the second-sensor scan lines SSB1 to SSBk. The sensor pixels SP may provide predetermined output currents corresponding to a touch state to the output lines O1 to Om during a supply period for the first sensor scan signals or during a supply period for the second sensor scan signals.

The first-sensor scan lines SSA1 to SSAn and the second-sensor scan lines SSB1 to SSBk may be disposed on the substrate SUB, and may be extended in a first direction (e.g., an x axis direction) and coupled to the sensor pixels SP on a sensor pixel row basis.

In particular, at least two of the sensor pixel rows may be coupled to the same second-sensor scan line (e.g., one of SSB1 to SSBk), and may simultaneously receive the second sensor scan signals from the second-sensor scan line (e.g., one of SSB1 to SSBk).

The output lines O1 to Om may be disposed on the substrate SUB, may be extended in a second direction (e.g., a y axis direction) and coupled to the sensor pixels SP on a line basis.

Further, the sensor pixels SP may be coupled to reference voltage lines P1 to Pm, and may be supplied with a reference voltage Vcom through the reference voltage lines P1 to Pm.

The reference voltage lines P1 to Pm may be extended in the second direction, and may be coupled to the sensor pixels SP on a line basis. In an exemplary embodiment, the reference voltage lines P1 to Pm may be arranged in parallel to the output lines O1 to Om, for example.

However, the arrangement direction of the reference voltage lines P1 to Pm may be changed in various forms, and in another exemplary embodiment, the reference voltage lines P1 to Pm may be arranged in parallel to, for example, the sensor scan lines SSA1 to SSAn or SSB1 to SSBk.

The reference voltage lines P1 to Pm may be electrically coupled to each other in order to maintain the same potential. In an exemplary embodiment, the reference voltage lines P1 to Pm may be electrically coupled to each other in an outer portion of the substrate SUB via separate wiring Pa, for example.

The sensor driver 104 may include a first sensor scan driver 110A, a second sensor scan driver 110B, a read-out circuit 120, a power supply 130, and a touch mode controller 140.

The first sensor scan driver 110A may supply the first sensor scan signals to the sensor pixels SP through the first-sensor scan lines SSA1 to SSAn in response to a first control signal CS1 received from the touch mode control unit 140.

In an exemplary embodiment, the first sensor scan driver 110A may sequentially output the first sensor scan signals to the first-sensor scan lines SSA1 to SSAn, for example.

Further, the first sensor scan driver 110A may output the first sensor scan signals to the first-sensor scan lines SSA1 to SSAn so that all of the sensor pixels SP provide output currents in a fingerprint sensing mode.

The second sensor scan driver 110B may supply the second sensor scan signals to the sensor pixels SP through the second-sensor scan lines SSB1 to SSBk in response to a second control signal CS2 received from the touch mode controller 140.

In an exemplary embodiment, the second sensor scan driver 110B may sequentially output the second sensor scan signals to the second-sensor scan lines SSB1 to SSBk, for example.

Further, the second sensor scan driver 110B may output the second sensor scan signals to the second-sensor scan lines SSB1 to SSBk so that some of the sensor pixels SP provide output currents in a touch sensing mode.

The first and second sensor scan signals may have voltage levels sufficient to turn on transistors that are supplied with the first and second sensor scan signals. Here, the voltage levels of the first and second sensor scan signals may be identical to or different from each other.

The first and second sensor scan drivers 110A and 110B may be directly disposed (e.g., mounted) on the substrate SUB or may be coupled to the substrate SUB through a separate component, such as a flexible printed circuit board ("FPCB").

The read-out circuit 120 may receive signals (e.g., output currents), output from the sensor pixels SP, through the output lines O1 to Om.

In an exemplary embodiment, when the first sensor scan driver 110A sequentially supplies the first sensor scan signals, the sensor pixels SP may be selected on a line basis, and the read-out circuit 120 may sequentially receive the output currents from the selected sensor pixels SP, for example.

In an exemplary embodiment, when the second sensor scan driver 110B sequentially supplies the second sensor scan signals, the sensor pixels SP may be selected on the basis of at least two sensor pixel rows, and the read-out circuit 120 may sequentially receive the output currents from the selected sensor pixels SP, for example.

Here, the read-out circuit 120 may recognize current touch information TI by sensing a change in output current.

In an exemplary embodiment, the touch information TI may include at least one of the location of a touch made on the touch sensor 100, pressure applied by the touch, and a valley/ridge included in a fingerprint, for example.

The read-out circuit 120 may be directly disposed (e.g., mounted) on the substrate SUB or may be coupled to the substrate SUB through a separate component, such as an FPCB.

The power supply 130 may supply a reference voltage Vcom to the sensor pixels SP through the reference voltage lines P1 to Pm.

Further, the power supply 130 may be directly disposed (e.g., mounted) on the substrate SUB or may be coupled to the substrate SUB through a separate component, such as an FPCB.

The touch mode controller 140 may determine a fingerprint sensing mode or a touch sensing mode. The touch mode controller 140 may supply the first control signal CS1 to the first sensor scan driver 110A for a first period in the fingerprint sensing mode. Further, the touch mode controller 140 may supply the second control signal CS2 to the second sensor scan driver 110B for a second period in the touch sensing mode.

In an exemplary embodiment, the first period corresponding to the fingerprint sensing mode and the second period corresponding to the touch sensing mode may be alternately repeated. That is, the touch mode controller 140 may alternately provide the control signal CS1 or CS2 to the first and second sensor scan drivers 110A and 110B, respectively.

In another exemplary embodiment, the second period corresponding to the touch sensing mode may be kept longer than the first period corresponding to the fingerprint sensing mode.

Further, the touch mode controller 140 may receive the touch information TI from the read-out circuit 120 and may then determine the fingerprint sensing mode or the touch sensing mode.

In an exemplary embodiment, when the current touch information TI provided from the read-out circuit 120 includes the result of fingerprint recognition, the touch mode controller 140 may determine the current sensing mode to be the fingerprint sensing mode, for example. Further, the touch mode controller 140 may provide the second control signal CS2 to the second sensor scan driver 110B so as to sense a touch location.

When the current touch information TI provided from the read-out circuit 120 includes information about a touch location, the touch mode controller 140 may determine the current sensing mode to be the touch sensing mode. Further, the touch mode controller 140 may provide the first control signal CS1 to the first sensor scan driver 110A so as to sense a fingerprint.

The touch mode controller 140 may provide a third control signal CS3 to the read-out circuit 120 so as to improve a sensing speed in the touch sensing mode. The read-out circuit 120 may sense a touch location using some of the output currents, provided from the output lines O1 to Om, in response to the third control signal CS3.

The touch mode controller 140 may be directly disposed (e.g., mounted) on the substrate SUB or may be coupled to the substrate SUB through a separate component, such as an FPCB.

Although the first and second sensor scan drivers 110A and 110B, the read-out circuit 120, the power supply 130, and the touch mode controller 140 are individually illustrated in FIG. 2, at least some of the components may be integrated when necessary.

Further, the first and second sensor scan drivers 110A and 110B, the read-out circuit 120, the power supply 130, and the touch mode controller 140 may be installed using any of various methods, such as chip on glass, chip on plastic, tape carrier package, and chip on film methods.

Figure 4:
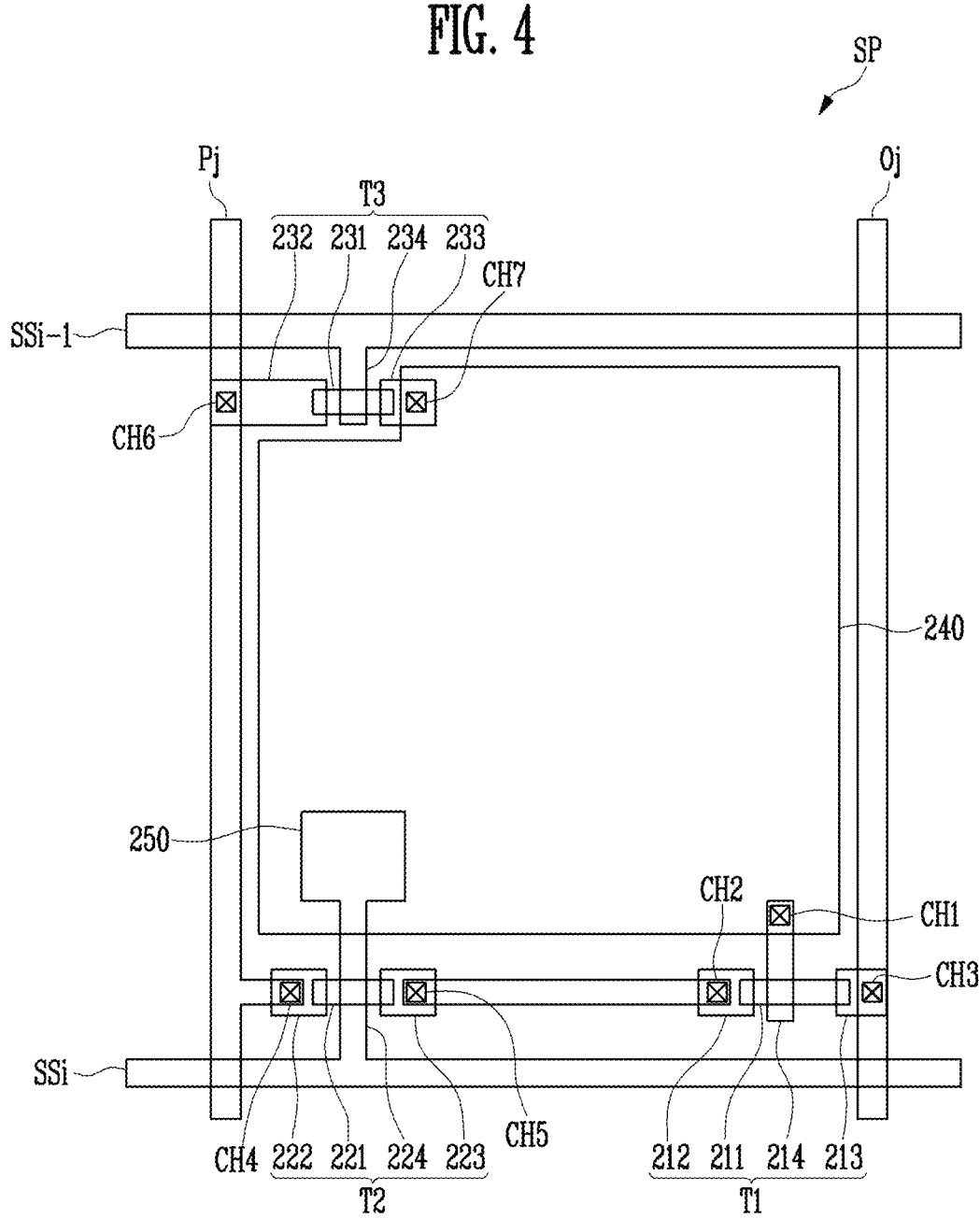
FIG. 4 is a plan view of an exemplary embodiment of a sensor pixel according to the invention.

FIG. 4 is a plan view of a sensor pixel according to an exemplary embodiment of the invention.

In FIG. 4, for the convenience of description, a sensor pixel SP coupled to an i-th sensor scan line SSi and a j-th output line Oj is illustrated (where i is an integer of 2 or more and j is a natural number).

Here, the i-th sensor scan line SSi may denote an i-th first-sensor scan line SSAi and an i−1-th sensor scan line SSi-1 may denote an i−1-th first-sensor scan line SSAi-1. Alternatively, the i-th sensor scan line SSi may denote an i-th second-sensor scan line SSBi and the i−1-th sensor scan line SSi-1 may denote an i−1-th second-sensor scan line SSBi-1.

Referring to FIG. 4, the sensor pixel SP according to an exemplary embodiment of the invention may include a sensor electrode 240, a first transistor T1, a second transistor T2, a third transistor T3, and a capacitor electrode 250.

The first transistor T1 may control an output current flowing to the j-th output line Oj. For this operation, the first transistor T1 may be coupled between the j-th output line Oj and the second transistor T2.

In an exemplary embodiment, the first transistor T1 may include a first electrode 212 coupled to a second electrode 223 of the second transistor T2, a second electrode 213 coupled to the j-th output line Oj, a gate electrode 214 coupled to the sensor electrode 240, and a semiconductor layer 211 coupled between the first electrode 212 and the second electrode 213, for example.

Further, the gate electrode 214, the first electrode 212, and the second electrode 213 of the first transistor T1 may be coupled to other components through respective contact holes CH1, CH2, and CH3.

Therefore, the first transistor T1 may control an output current that is output to the j-th output line Oj in response to the potential of the sensor electrode 240.

The second transistor T2 may be coupled between a j-th reference voltage line Pj and the first transistor T1.

In an exemplary embodiment, the second transistor T2 may include a first electrode 222 coupled to the j-th reference voltage line Pj, a second electrode 223 coupled to the first electrode 212 of the first transistor T1, a gate electrode 224 coupled to the i-th sensor scan line SSi, and a semiconductor layer 221 coupled between the first electrode 222 and the second electrode 223, for example.

Further, the first electrode 222 and the second electrode 223 of the second transistor T2 may be coupled to other components through respective contact holes CH4 and CH5.

Therefore, the second transistor T2 may be turned on when a sensor scan signal is supplied to the i-th sensor scan line SSi. When the second transistor T2 is turned on, a reference voltage Vcom (refer to FIG. 2) may be applied to the first electrode 212 of the first transistor T1.

The third transistor T3 may be coupled between the j-th reference voltage line Pj and the sensor electrode 240.

In an exemplary embodiment, the third transistor T3 may include a first electrode 232 coupled to the j-th reference voltage line Pj, a second electrode 233 coupled to the sensor electrode 240, a gate electrode 234 coupled to the i−1-th sensor scan line SSi-1, and a semiconductor layer 231 coupled between the first electrode 232 and the second electrode 233, for example.

Further, the first electrode 232 and the second electrode 233 of the third transistor T3 may be coupled to other components through respective contact holes CH6 and CH7.

Therefore, the third transistor T3 may be turned on when a sensor scan signal is supplied to the i−1-th sensor scan line SSi-1. When the third transistor T3 is turned on, the voltage of the sensor electrode 240 may be initialized to the reference voltage Vcom.

The capacitor electrode 250 may be disposed to overlap the sensor electrode 240, and may then form a capacitor with the sensor electrode 240.

Further, the capacitor electrode 250 may be coupled to the i-th sensor scan line SSi. In an exemplary embodiment, the capacitor electrode 250 may be coupled to the i-th sensor scan line SSi through the gate electrode 224 of the second transistor T2, for example.

Here, the capacitor electrode 250 and the gate electrode 224 of the second transistor T2 may include a material identical to that of the i-th sensor scan line SSi.

The sensor electrode 240 may not only form a capacitor with the capacitor electrode 250, but also form a capacitor in response to a touch made by a finger or the like.

Further, the sensor electrode 240 may include a conductive material.

In an exemplary embodiment, the conductive material may include at least one of a metal material, an alloy of metal materials, a conductive polymer, and a transparent conductive material, for example.

In an exemplary embodiment, the metal material may include at least one of copper, silver, platinum, palladium, nickel, tin, aluminum, cobalt, rhodium, iridium, iron, ruthenium, osmium, manganese, molybdenum, tungsten, niobium, tantalum, titanium, bismuth, antimony, and lead, for example.

In an exemplary embodiment, the conductive polymer may include at least one of polythiophene, polypyrrole, polyaniline, polyacetylene and polyphenylene compounds, and combinations thereof. In an exemplary embodiment, as the conductive polymer, polythiophenes including poly-3,4-ethylenedioxythiophene/polystyrenesulfonate ("PEDOT/PSS") compounds may be used, for example.

In an exemplary embodiment, the transparent conductive material may include at least one of silver nanowires (AgNW), indium tin oxide ("ITO"), indium zinc oxide ("IZO"), antimony zinc oxide ("AZO"), indium tin zinc oxide ("ITZO"), zinc oxide (ZnO), tin oxide (SnO2), a carbon nanotube, and graphene, for example.

Figure 5A:
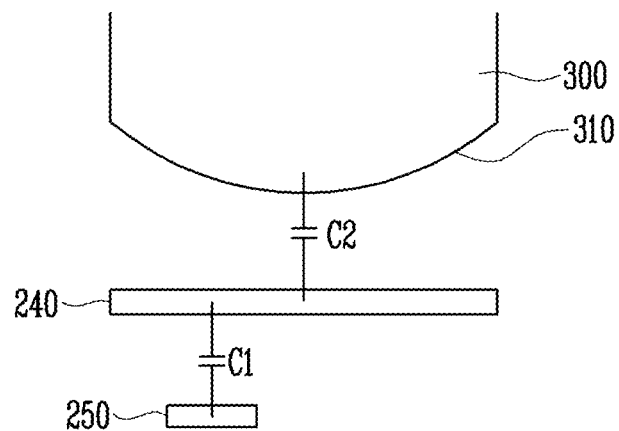
FIGS. 5A and 5B are diagrams for explaining that the capacitance of a capacitor changes depending on the ridge and valley of a fingerprint.
Figure 5B:
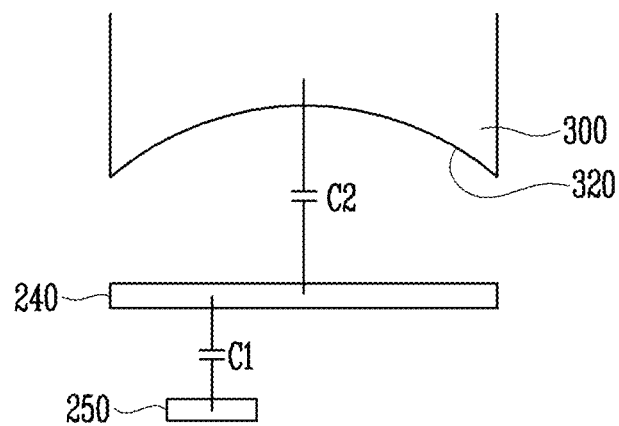

FIGS. 5A and 5B are diagrams for explaining that the capacitance of a capacitor changes depending on the valley and ridge of a fingerprint. FIG. 5A illustrates a case where a ridge 310 of a finger 300 is located on a sensor pixel SP, and FIG. 5B illustrates a case where a valley 320 of the finger 300 is located on the sensor pixel SP.

Referring to FIGS. 5A and 5B, the sensor electrode 240 and the capacitor electrode 250 may form a first capacitor C1. The sensor electrode 240 and the capacitor electrode 250 may be located to be spaced apart from each other, and at least one insulating layer (not illustrated) may be interposed therebetween.

Further, when the finger 300 of a user is placed on the sensor pixel SP to recognize a fingerprint, the sensor electrode 240 and the finger 300 may form a second capacitor C2.

Here, the second capacitor C2 is a variable capacitor, the capacitance of which may vary depending on whether the ridge 310 or valley 320 of the fingerprint is placed on the sensor electrode 240.

That is, since a distance between the ridge 310 and the sensor electrode 240 is shorter than a distance between the valley 320 and the sensor electrode 240, the capacitance of the second capacitor C2 in a case where the ridge 310 is placed on the sensor electrode 240, as shown in FIG. 3A, and the capacitance of the second capacitor C2 in a case where the valley 320 is placed on the sensor electrode 240, as illustrated in FIG. 3B, may differ from each other.

Since a change in the capacitance of the second capacitor C2 influences the output current of the sensor pixel SP, the read-out circuit 120 (refer to FIG. 2) may recognize the fingerprint of the user by sensing a change in the output current.

Figure 6:
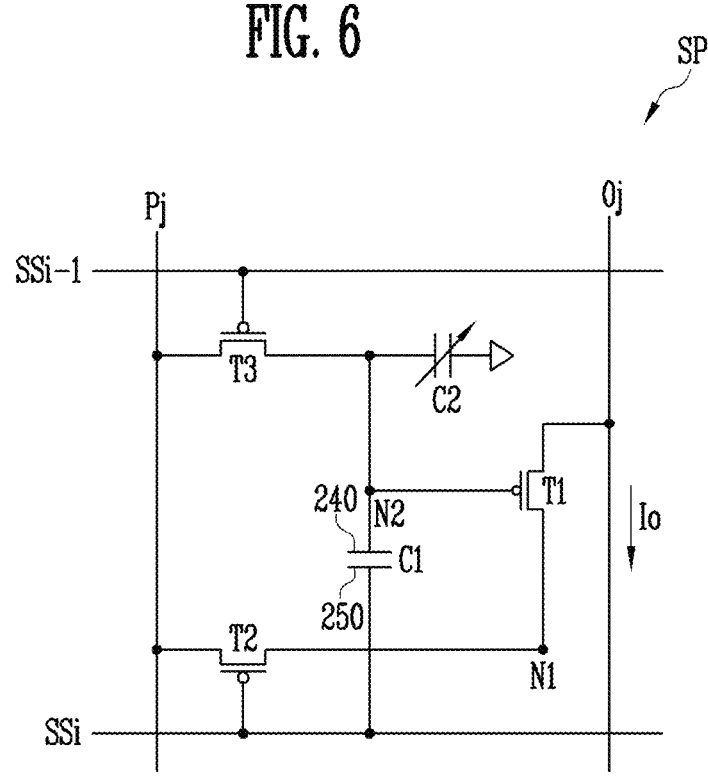
FIG. 6 is an equivalent circuit diagram illustrating an example of a sensor pixel illustrated in FIG. 2.
Figure 7A:
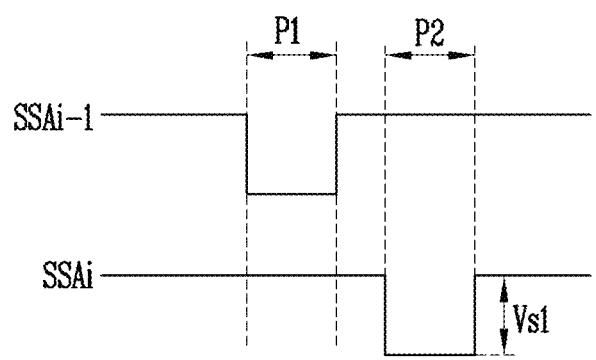
FIGS. 7A and 7B are timing diagrams for explaining the operation of the sensor pixel illustrated in FIG. 6.
Figure 7B:
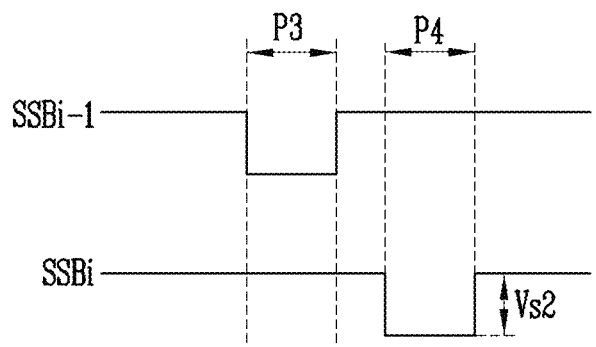

FIG. 6 is an equivalent circuit diagram illustrating an example of the sensor pixel illustrated in FIG. 2, and FIGS. 7A and 7B are timing diagrams for explaining the operation of the sensor pixel illustrated in FIG. 6.

In FIGS. 6, 7A, and 7B, in order to avoid a repetitive description, a description will be made based on differences from the above-described exemplary embodiment. Parts that are not especially described in FIGS. 6, 7A, and 7B conform to the above-described exemplary embodiment, where the same reference numerals are used to designate the same components and similar reference numerals are used to designate similar components.

In particular, for the convenience of the description, a sensor pixel SP coupled to an i-th sensor scan line SSi, an i–1-th sensor scan line SSi-1, and a j-th output line Oj is illustrated in FIG. 6.

Further, in FIG. 7A, a first sensor scan signal that is supplied to an i–1-th first-sensor scan line SSAi-1 and a first sensor scan signal that is supplied to an i-th first-sensor scan line SSAi are illustrated. Furthermore, in FIG. 7B, a second sensor scan signal that is supplied to an i–1-th second-sensor scan line SSBi-1 and a second sensor scan signal that is supplied to an i-th second-sensor scan line SSBi are illustrated in FIG. 7B.

Referring to FIG. 6, the sensor pixel SP may include a first capacitor C1, a first transistor T1, a second transistor T2, and a third transistor T3.

As described above, the first capacitor C1 may be formed by the sensor electrode 240 and the capacitor electrode 250.

Further, the second capacitor C2, which is a variable capacitor, may be formed by the sensor electrode 240 and a user's finger 300 (refer to FIGS. 5A and 5B), as described above. Here, the capacitance of the second capacitor C2 may change depending on a distance between the sensor electrode 240 and the finger 300, information about whether the valley or ridge of a fingerprint is placed on the sensor electrode 240, the strength of pressure applied by a touch, or the like.

The first transistor T1 may include a first electrode coupled to a second electrode of the second transistor T2, a second electrode coupled to the j-th output line Oj, and a gate electrode coupled to the sensor electrode 240.

That is, the first transistor T1 may be coupled between the j-th output line Oj and a first node N1, and the gate electrode thereof may be coupled to a second node N2. Further, the first transistor T1 may control an output current Io flowing from the second transistor T2 to the j-th output line Oj.

The second transistor T2 may include a first electrode coupled to a j-th reference voltage line Pj, a second electrode coupled to the first electrode of the first transistor T1, and a gate electrode coupled to the i-th sensor scan line SSi.

That is, the second transistor T2 may be coupled between the j-th reference voltage line Pj and the first node N1, and the gate electrode thereof may be coupled to the i-th sensor scan line SSi.

The second transistor T2 may be turned on when a sensor scan signal is supplied to the i-th sensor scan line SSi. When the second transistor T2 is turned on, a reference voltage Vcom (refer to FIG. 2) may be applied to the first electrode of the first transistor T1.

The third transistor T3 may include a first electrode coupled to the j-th reference voltage line Pj, a second electrode coupled to the sensor electrode 240, and a gate electrode coupled to the i–1-th sensor scan line SSi-1.

That is, the third transistor T3 may be coupled between the second node N2 and the j-th reference voltage line Pj, and the gate electrode thereof may be coupled to the i–1-th sensor scan line SSi-1.

The third transistor T3 may be turned on when the sensor scan signal is supplied to the i–1-th sensor scan line SSi-1. When the third transistor T3 is turned on, the voltage of the sensor electrode 240 may be initialized to the reference voltage Vcom.

The first capacitor C1 may include the sensor electrode 240 coupled to the second electrode of the third transistor T3, and the capacitor electrode 250 coupled to the i-th sensor scan line SSi.

That is, the first capacitor C1 may be coupled between the second node N2 and the i-th sensor scan line SSi.

The first node N1 is a node to which the first electrode of the first transistor T1 and the second electrode of the second transistor T2 are coupled in common, and the second node N2 is a node to which the sensor electrode 240, the gate electrode of the first transistor T1, and the second electrode of the third transistor T3 are coupled in common.

Here, the first electrode of each of the transistors T1, T2, and T3 may be set to any one of a source electrode and a drain electrode, and the second electrode of each of the transistors T1, T2, and T3 may be set to an electrode different from the first electrode. In an exemplary embodiment, when the first electrode is set to a source electrode, the second electrode may be set to a drain electrode, for example.

Although the transistors T1, T2, and T3 are exemplarily illustrated as being P-type metal-oxide-semiconductor ("PMOS") transistors in FIG. 6, the transistors T1, T2, and T3 may be implemented as N-type metal-oxide-semiconductor ("NMOS") transistors in other exemplary embodiments.

Referring to FIG. 7A, during a first scan period P1, a first sensor scan signal may be supplied to the i–1-th first-sensor scan line SSAi-1.

Therefore, during the first scan period P1, the third transistor T3 may remain turned on, and the second node N2 may be initialized to the reference voltage Vcom which is applied from the j-th reference voltage line Pj.

Thereafter, during a second scan period P2, the first sensor scan signal may be supplied to an i-th first-sensor scan line SSAi.

Therefore, during the second scan period P2, the second transistor T2 may remain turned on, and the output current Io may flow from the j-th reference voltage line Pj to the j-th output line Oj through the second transistor T2 and the first transistor T1.

Here, the first transistor T1 may control the magnitude of the output current Io to be output in response to a gate voltage (i.e., voltage applied to the second node N2).

In an exemplary embodiment, the output current Io may change depending on the gate voltage of the first transistor T1, and the gate voltage of the first transistor T1 may be determined by the following equation, for example:

$$Vg=Vcom+\{C1/(C1+C2)\}*Vs1$$

Here, Vg denotes the gate voltage, Vcom denotes the reference voltage, C1 denotes the capacitance of the first capacitor C1, C2 denotes the capacitance of the second capacitor C2, and Vs1 denotes a change in the voltage of the first sensor scan signal that is supplied to the i-th first-sensor scan line SSAi.

Referring to FIG. 7B, during a third scan period P3, the second sensor scan signal may be supplied to the i−1-th second-sensor scan line SSBi-1.

Accordingly, during the third scan period P3, the third transistor T3 may remain turned on, and the second node N2 may be initialized to the reference voltage Vcom which is applied from the j-th reference voltage line Pj.

Thereafter, the second sensor scan signal may be supplied to the i-th second-sensor scan line SSBi during a fourth scan period P4.

Therefore, during the fourth scan period P4, the second transistor T2 may remain turned on, and the output current Io may flow from the j-th reference voltage line Pj to the j-th output line Oj through the second transistor T2 and the first transistor T1.

Here, the first transistor T1 may control the amount of output current Io to be output in response to a gate voltage (i.e., voltage applied to the second node N2).

In an exemplary embodiment, the output current Io may change depending on the gate voltage of the first transistor T1, and the gate voltage of the first transistor T1 may be determined by the following equation, for example:

$$Vg=Vcom+\{C1/(C1+C2)\}*Vs2$$

Here, Vg denotes the gate voltage, Vcom denotes the reference voltage, C1 denotes the capacitance of the first capacitor C1, C2 denotes the capacitance of the second capacitor C2, and Vs2 denotes a change in the voltage of the second sensor scan signal that is supplied to the i-th second-sensor scan line SSBi.

In this case, the voltage change Vs1 of the first sensor scan signal, described with reference to FIG. 7A, may have a value greater than that of the voltage change Vs2 of the second sensor scan signal. A description thereof will be made in detail later with reference to FIG. 10.

As described above, the read-out circuit 120 (refer to FIG. 2) may determine whether a touch has been made and may sense the fingerprint of the user by using the output current Io that changes depending on the gate voltage of the first transistor T1.

Figure 9:
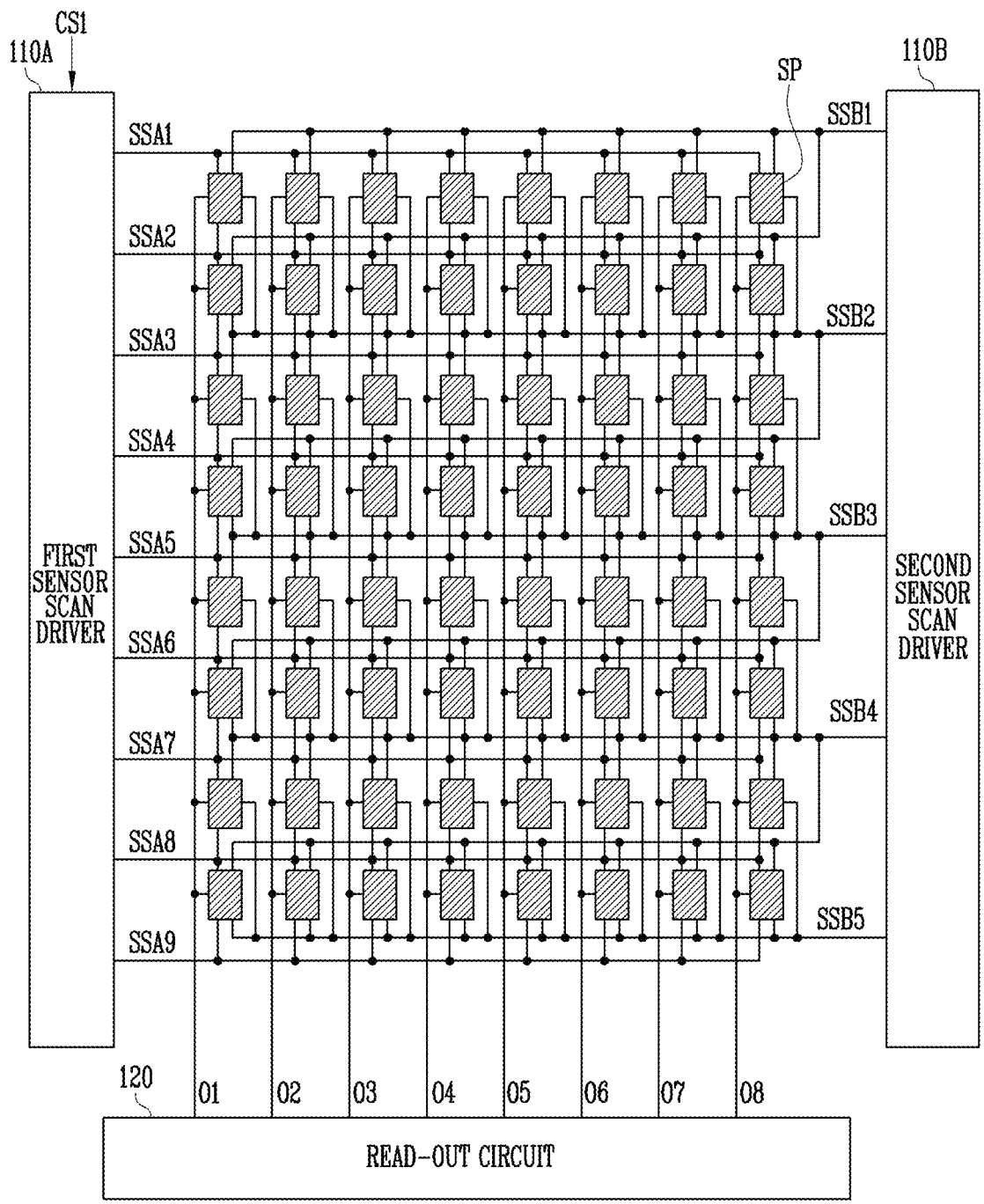
Figure 10:
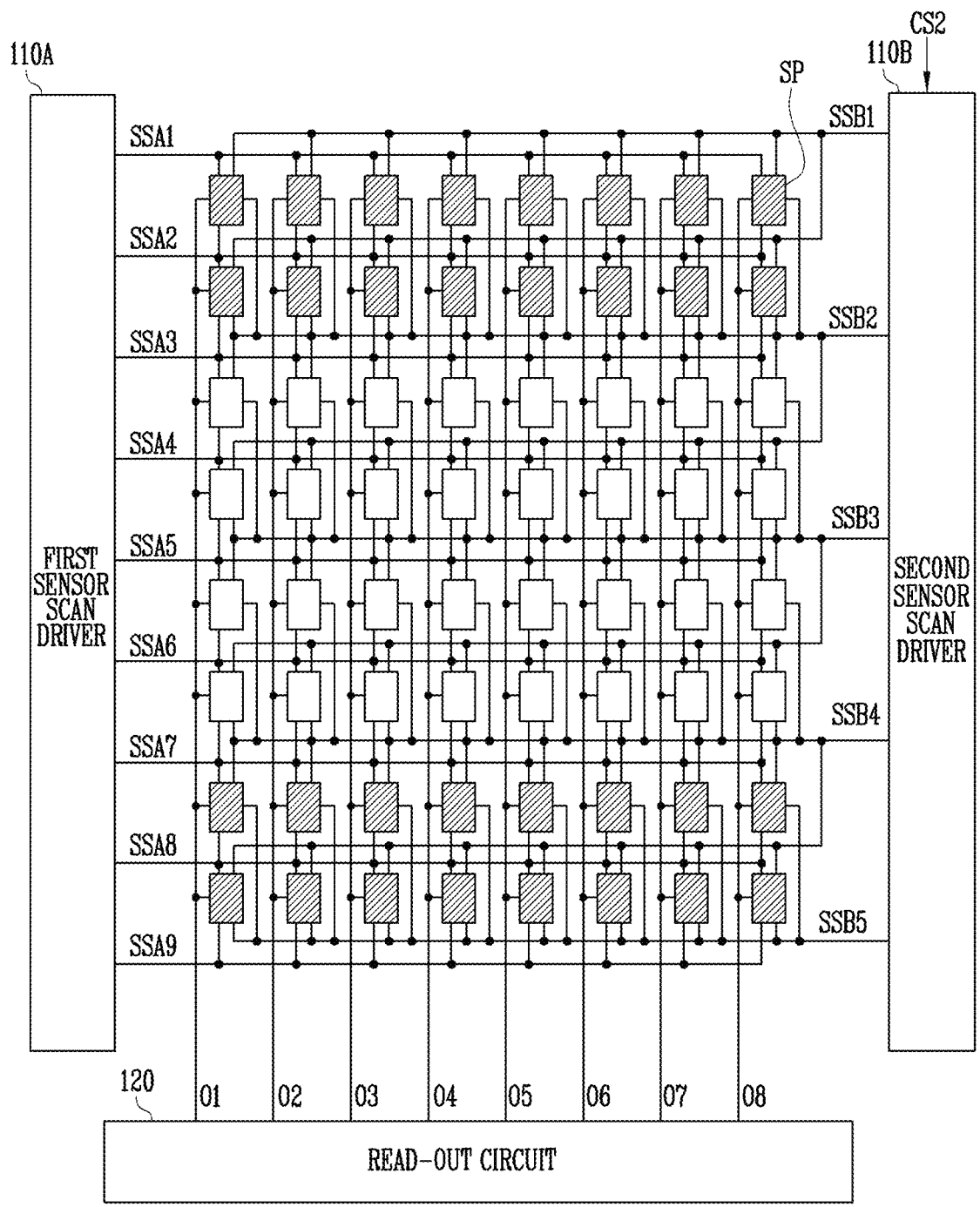

FIGS. 8, 9, and 10 are diagrams for explaining a method of driving a touch sensor according to an exemplary embodiment of the invention.

In FIGS. 8, 9, and 10, first-sensor scan lines SSA1 to SSA9, second-sensor scan lines SSB1 to SSB5, output lines O1 to O8, and sensor pixels SP arranged in an 8×8 matrix structure are illustrated. This configuration is intended to conceptually illustrate the touch sensor 100 shown in FIG. 1 for the convenience of description. The numbers and arrangement shapes of the first-sensor scan lines SSA1 to SSA9, the second-sensor scan lines SSB1 to SSB5, the output lines O1 to O8, and the sensor pixels SP in the 8×8 matrix structure are not limited to those examples, but may be modified and practiced in various forms.

Although the power supply 130, the reference voltage lines P1 to Pm, and the touch mode controller 140 (refer to FIG. 2) are not illustrated in FIG. 8 for the convenience of description, the sensor pixels SP may each be supplied with a reference voltage Vcom from the power supply 130, and the first and second sensor scan drivers 110A and 110B may be provided with a control signal CS1 or CS2 from the touch mode controller 140.

Referring to FIG. 8, the first sensor scan driver 110A may be coupled to the sensor pixels SP through the first-sensor scan lines SSA1 to SSA9, and the second sensor scan driver 110B may be coupled to the sensor pixels SP through the second-sensor scan lines SSB1 to SSB5. Further, the read-out circuit 120 may be coupled to the sensor pixels SP through the output lines O1 to O8.

In detail, the first sensor scan driver 110A may be coupled to one sensor pixel row or two sensor pixel rows through one first-sensor scan line.

In an exemplary embodiment, the first sensor scan driver 110A may be coupled to a first sensor pixel row through the first first-sensor scan line SSA1, and may be coupled to an eighth sensor pixel row through the ninth first-sensor scan line SSA9, for example. The first sensor scan driver 110A may be coupled to two sensor pixel rows through each of the second to eighth first-sensor scan lines SSA2 to SSA8.

The second sensor scan driver 110B may be coupled to two sensor pixel rows or four sensor pixel rows through one second-sensor scan line.

In an exemplary embodiment, the second sensor scan driver 110B may be coupled to first and second sensor pixel rows through the first second-sensor scan line SSB1, and may be coupled to seventh and eighth sensor pixel rows through the fifth second-sensor scan line SSB5, for example. The second sensor scan driver 110B may be coupled to four sensor pixel rows through each of the second to fourth second-sensor scan lines SSB2 to SSB4.

The read-out circuit 120 may be coupled to one sensor pixel column through one output line.

In an exemplary embodiment, the read-out circuit 120 may be coupled to a first sensor pixel column through the first output line O1, and may be coupled to second to eighth sensor pixel columns through the remaining output lines O2 to O8, respectively, for example.

In FIG. 8, an exemplary embodiment is illustrated in which, in order to explain a method by which the second sensor scan driver 110B simultaneously activates a plurality of sensor pixels SP in a touch sensing mode, one second-sensor scan line and a plurality of sensor pixel rows are coupled. However, a connection relationship between the second sensor scan driver 110B and the sensor pixel rows is not limited to the exemplary embodiment illustrated in FIG. 8, and may be modified and practiced in various forms.

In an exemplary embodiment, the second sensor scan driver 110B may be coupled to two or more sensor pixel rows through one second-sensor scan line, and the numbers of sensor pixel rows to which the second-sensor scan lines are respectively coupled may differ from each other, for example. That is, the second sensor scan driver 110B may be coupled to first, second, and fourth sensor pixel rows through the first second-sensor scan line SSB1, and may be coupled to first, second, fourth, and fifth sensor pixel rows through the second second-sensor scan line SSB2.

In this way, the exemplary embodiment in which the second sensor scan driver 110B is coupled to the sensor pixels SP may be modified in various forms.

Referring to FIG. 9, an exemplary embodiment is illustrated in which the first sensor scan driver 110A supplies first sensor scan signals to sensor pixels SP in a fingerprint sensing mode. Here, sensor pixels SP indicated by hatched patterns mean an active region in which the read-out circuit 120 may sense a touch using an output current Io (refer to FIG. 6).

The touch mode controller 140 (refer to FIG. 2) may provide the first control signal CS1 to the first sensor scan driver 110A in the fingerprint sensing mode. The first sensor scan driver 110A may sequentially supply first sensor scan signals to sensor scan lines ranging from the first first-sensor scan line SSA1 to the ninth first-sensor scan line SSA9 in response to the first control signal CS1.

The sensor pixels SP, which receive the first sensor scan signals, may provide output currents Io to the read-out circuit 120 through the output lines O1 to O8.

In detail, when a first sensor scan signal is supplied to a first sensor pixel row through the first first-sensor scan line SSA1, the sensor pixels SP in the first sensor pixel row perform an initialization procedure. That is, the gate voltage Vg of a first transistor T1 in each of the sensor pixels SP is initialized to the reference voltage Vcom (refer to FIG. 2).

Further, when first sensor scan signals are supplied to first and second sensor pixel rows through the second first-sensor scan line SSA2, the sensor pixels SP in the first sensor pixel row provide output currents Io, and the sensor pixels SP in the second sensor pixel row perform an initialization procedure. That is, the second transistors T2 in the sensor pixels SP in the first sensor pixel row are turned on, and thus the output currents Io are provided to the read-out circuit 120 through the first transistors T1.

Simultaneously, the gate voltage Vg of the first transistor T1 in each of the sensor pixels SP in the second sensor pixel row is initialized to the reference voltage Vcom.

In this way, the sensor pixels SP in each of the first to eighth sensor pixel rows may provide output currents Io to the read-out circuit 120.

Since all of the sensor pixels SP in the 8×8 matrix structure provide the output currents Io to the read-out circuit 120, the read-out circuit 120 may effectively sense a fingerprint composed of the ridge 310 and the valley 320 (refer to FIGS. 5A and 5B) using the output currents Io of all of the sensor pixels SP.

Referring to FIG. 10, an exemplary embodiment is illustrated in which the second sensor scan driver 110B supplies second sensor scan signals to the sensor pixels SP in a touch sensing mode.

The touch mode controller 140 (refer to FIG. 2) may provide the second control signal CS2 to the second sensor scan driver 110B in the touch sensing mode. The second sensor scan driver 110B may supply the second sensor scan signals to second-sensor scan lines SSB1 to SSB5 in response to the second control signal CS2.

The second sensor scan driver 110B according to an exemplary embodiment of the invention may supply the second sensor scan signals to some of the second-sensor scan lines SSB1 to SSB5 and may not supply the second sensor scan signals to the remaining second-sensor scan lines.

In an exemplary embodiment, the second sensor scan driver 110B may supply the second sensor scan signals to the remaining second-sensor scan lines SSB1, SSB2, SSB4, and SSB5 other than the third second-sensor scan line SSB3, among the first to fifth second-sensor scan lines SSB1 to SSB5, for example.

Here, when the second sensor scan signals are supplied to first and second sensor pixel rows through the first second-sensor scan line SSB1, the sensor pixels SP in the first and second sensor pixel rows perform an initialization procedure. That is, the gate voltage Vg of the first transistor in each of the sensor pixels SP is initialized to the reference voltage Vcom (refer to FIG. 2).

Further, when the second sensor scan signals are supplied to first to fourth sensor pixel rows through the second second-sensor scan line SSB2, the sensor pixels SP in the first and second sensor pixel rows simultaneously provide output currents Io (refer to FIG. 6), and the sensor pixels SP in the third and fourth sensor pixel rows perform an initialization procedure. That is, the second transistors T2 of the sensor pixels SP in the first and second sensor pixel rows are turned on, and thus the output currents Io are provided to the read-out circuit 120 through the first transistors T1.

Simultaneously with this operation, the gate voltage Vg of the first transistor T1 in each of the sensor pixels SP in the third and fourth sensor pixel rows is initialized to the reference voltage Vcom.

A second sensor scan signal is not supplied to the third second-sensor scan line SSB3. Therefore, the second transistors T2 of the sensor pixels SP in the third and fourth sensor pixel rows are not turned on. Further, the sensor pixels SP in the fifth and sixth sensor pixel rows do not perform an initialization procedure.

Furthermore, when the second sensor scan signals are supplied to fifth to eighth sensor pixel rows through the fourth second-sensor scan line SSB4, the sensor pixels SP in seventh and eighth sensor pixel rows perform an initialization procedure.

Finally, when the second sensor scan signals are supplied to the seventh and eighth sensor pixel rows through the fifth second-sensor scan line SSB5, the sensor pixels SP in the seventh and eighth sensor pixel rows simultaneously provide output currents Io.

Therefore, the read-out circuit 120 may sense a touch location using the output currents Io, which are output from the sensor pixels SP in the first, second, seventh, and eighth sensor pixel rows.

In this way, when the second sensor scan driver 110B supplies the second sensor scan signals to only some of the second-sensor scan lines SSB1 to SSB5, only some of the sensor pixels SP may be set to an active region in which a touch may be sensed.

Exemplary embodiments of the invention are not limited to the exemplary embodiment illustrated in FIG. 10, and the second sensor scan driver 110B according to the exemplary embodiment of the invention may be modified and practiced such that only some of the sensor pixels SP may sense a touch by selectively providing the second sensor scan signals to the second-sensor scan lines SSB1 to SSB5.

Further, as described above with reference to FIGS. 7A and 7B, the voltage change Vs1 of a first sensor scan signal may have a value greater than that of the voltage change Vs2 of a second sensor scan signal.

According to the following equations, which have been described above, the gate voltage Vg of the first transistor T1 is influenced by the voltage change Vs1 of the first sensor scan signal and the voltage change Vs2 of the second sensor scan signal.

$$Vg = Vcom + \{C1/(C1+C2)\} * Vs1$$

$$Vg = Vcom + \{C1/(C1+C2)\} * Vs2$$

The output current Io of the sensor pixel SP is proportional to the voltage change Vs1 of the first sensor scan signal or the voltage change Vs2 of the second sensor scan signal.

In the fingerprint sensing mode, the sensor pixels SP in each pixel row provide output currents Io to the read-out circuit 120, but, in the touch sensing mode, the sensor pixels SP in at least two pixel rows simultaneously provide output currents Io to the read-out circuit 120.

Therefore, the magnitude of output current Io flowing through one output line in the fingerprint sensing mode may be less than the magnitude of the output current Io flowing through one output line in the touch sensing mode.

The magnitude of output current Io may be reduced by setting the voltage change Vs2 of the second sensor scan signal to a low value. By means of this method, the voltage change Vs2 of the second sensor scan signal is set to a value less than the voltage change Vs1 of the first sensor scan signal, thus enabling the output current Io that flows through one output line to be adjusted to the same value in the fingerprint sensing mode and in the touch sensing mode.

Further, when the voltage change Vs2 of the second sensor scan signal is set to a low value, power consumption desired to provide the second sensor scan signal in the touch sensing mode may also be reduced.

Figure 11:
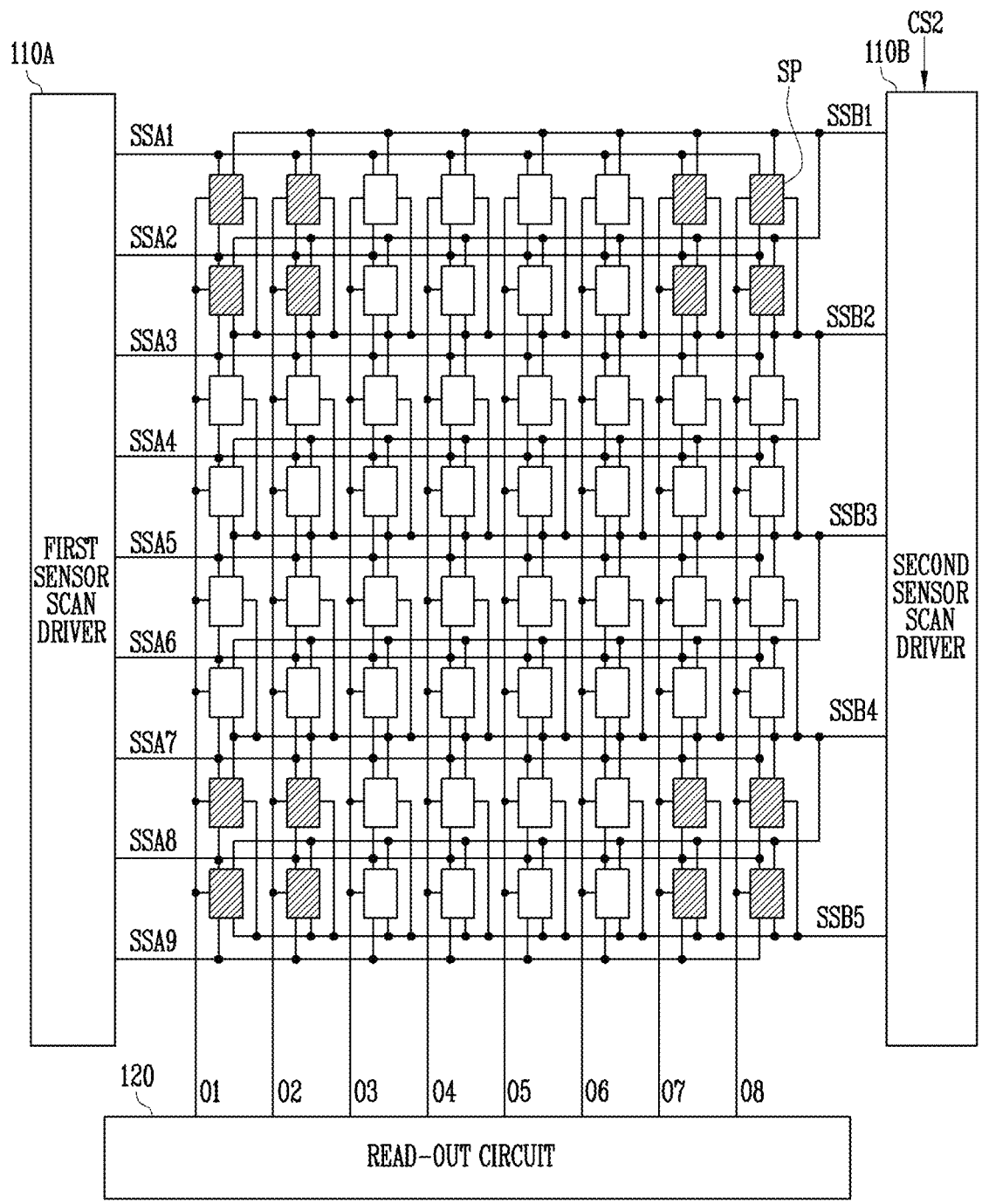
FIG. 11 is a diagram for explaining an exemplary embodiment of a method of driving a touch sensor according to the invention.

FIG. 11 is a diagram for explaining a method of driving a touch sensor according to an exemplary embodiment of the invention.

In FIG. 11, a description will be made based on differences from the above-described exemplary embodiments so as to avoid repetitive descriptions. Parts that are not especially described in FIG. 11 conform to the above-described exemplary embodiment, where the same reference numerals are used to designate the same components and similar reference numerals are used to designate similar components.

Referring to FIG. 11, the read-out circuit 120 may sense a touch location using some of output currents Io (refer to FIG. 6), which are provided from first to eighth output lines O1 to O8, in order to rapidly sense a touch location in a touch sensing mode.

In an exemplary embodiment, the read-out circuit 120 may sense a touch location using only the output currents Io which are provided from the first output line O1, the second output line O2, the seventh output line O7, and the eighth output line O8, for example.

If the second sensor scan driver 110B provides second sensor scan signals only to the first, second, fourth, and fifth second-sensor scan lines SSB1, SSB2, SSB4, and SSB5, the read-out circuit 120 may be provided with output currents Io from the sensor pixels SP in the first, second, seventh and eighth sensor pixel rows.

Here, since the read-out circuit 120 uses only the output currents Io, which are provided from the first output line O1, the second output line O2, the seventh output line O7, and the eighth output line O8, an active region in which a touch may be sensed may be set to sensor pixels SP indicated by hatched patterns, as shown in FIG. 11.

In this way, the read-out circuit 120 according to an exemplary embodiment of the invention uses only some of output currents Io, which are provided from the first to eighth output lines O1 to O8, so that the number of operations desired to calculate a touch location may be reduced, and thus the touch location may be rapidly sensed.

Figure 12:
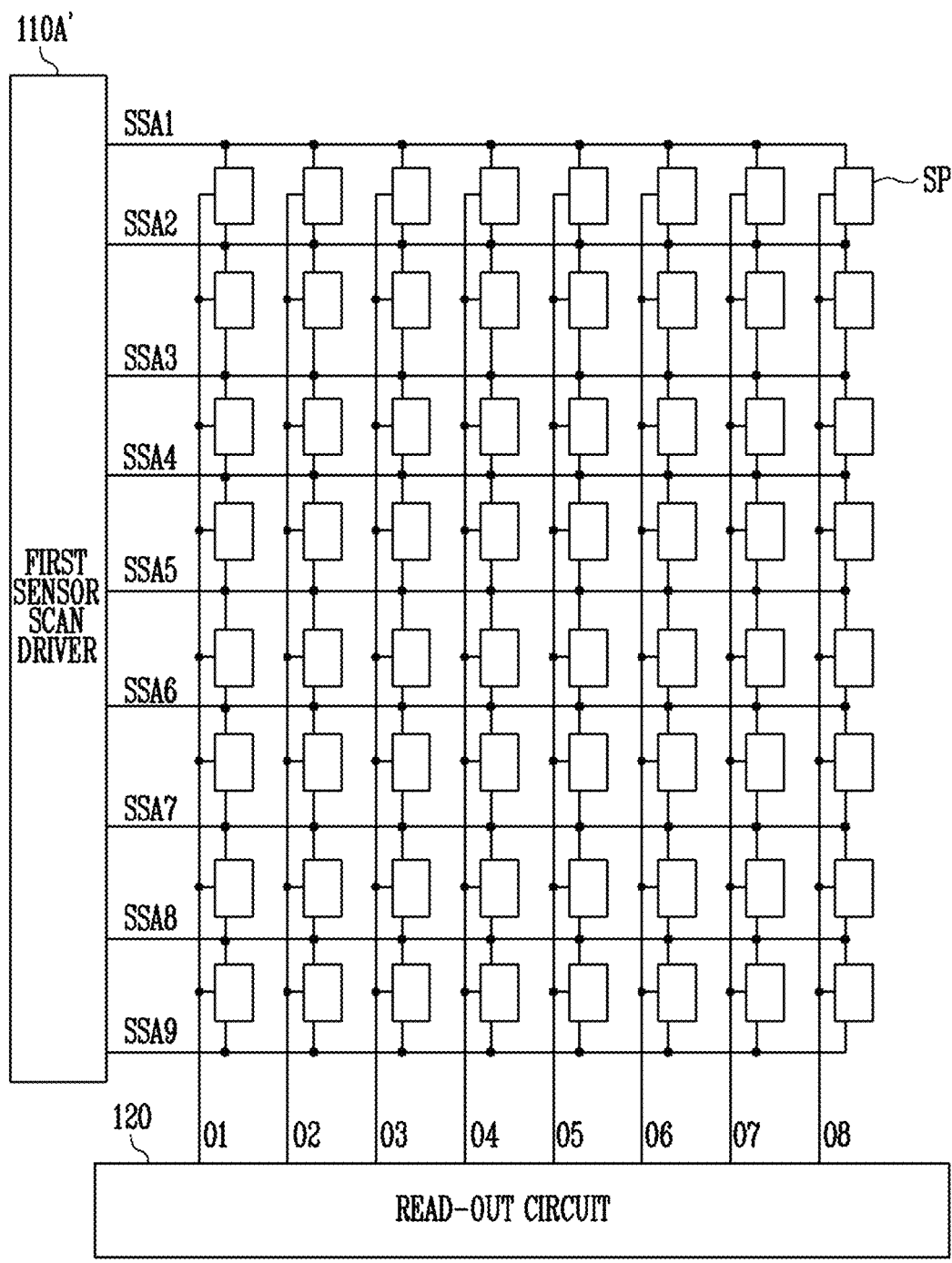
FIGS. 12, 13, and 14 are diagrams for explaining an exemplary embodiment of a method of driving a touch sensor according to the invention.
Figure 13:
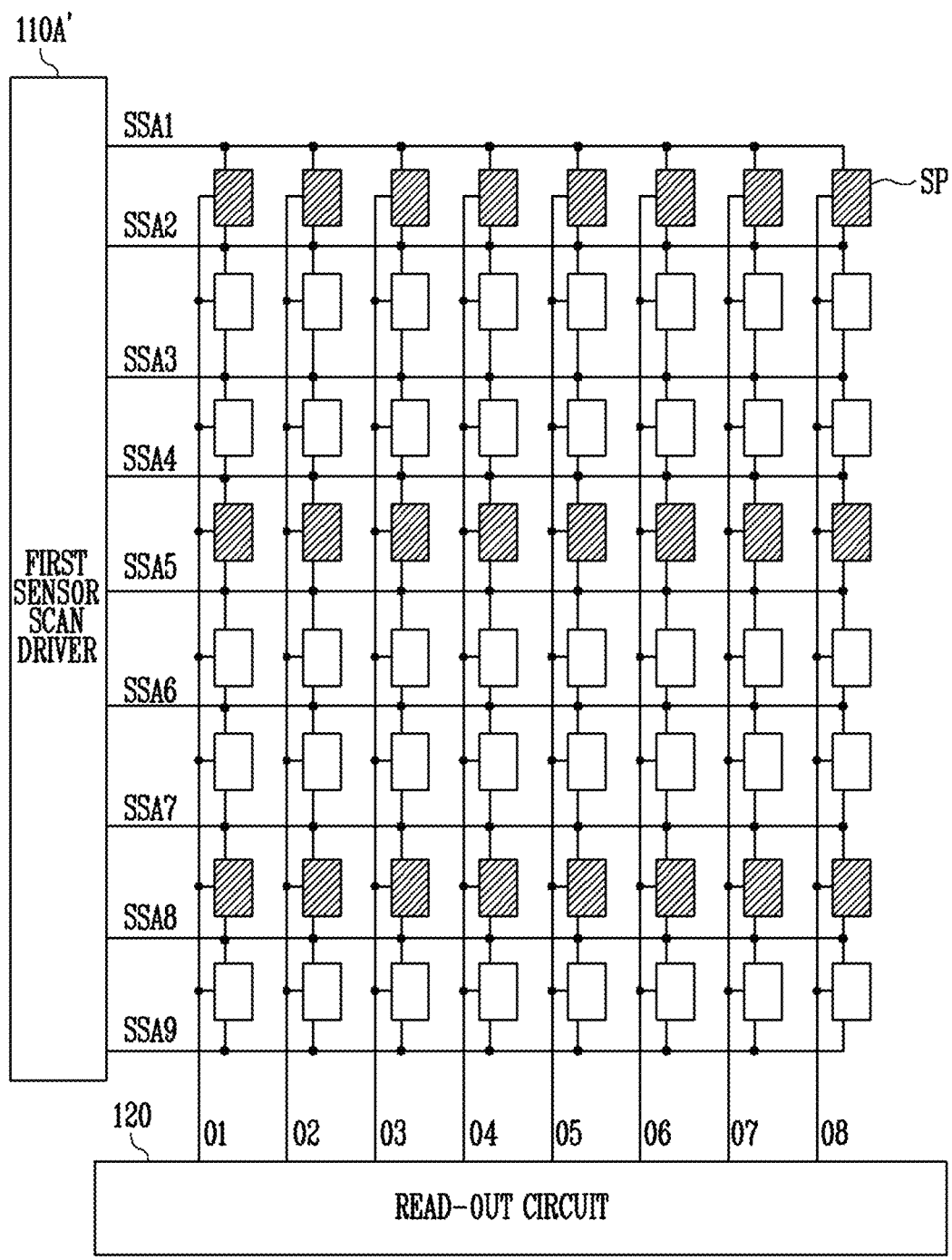
Figure 14:
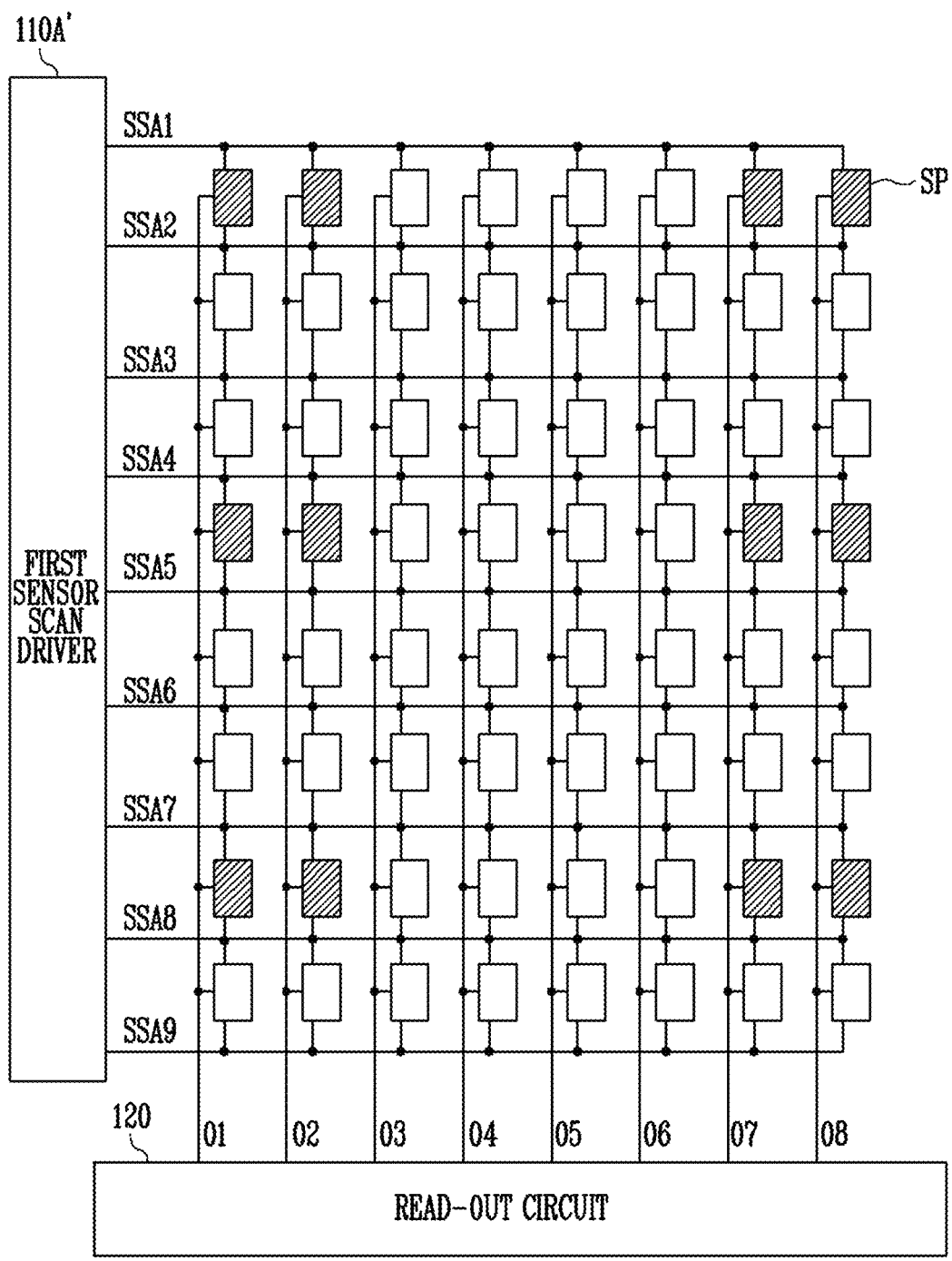

FIGS. 12, 13, and 14 are diagrams for explaining a method of driving a touch sensor according to an exemplary embodiment of the invention.

In FIGS. 12, 13, and 14, a description will be made based on differences from the above-described exemplary embodiments so as to avoid repetitive descriptions. Parts that are not especially described in FIGS. 12, 13, and 14 conform to the above-described exemplary embodiment, where the same reference numerals are used to designate the same components and similar reference numerals are used to designate similar components.

Referring to FIGS. 12 and 13, the touch sensor 100 (refer to FIG. 2) according to the exemplary embodiment of the invention may be driven in a fingerprint sensing mode or a touch sensing mode by changing a scheme in which a first sensor scan driver 110A' supplies first sensor scan signals.

The first sensor scan driver 110A' may be operated in the way, described above with reference to FIG. 9, in the fingerprint sensing mode.

Further, the first sensor scan driver 110A' may supply first sensor scan signals to some of first-sensor scan lines SSA1 to SSA9 and may not supply first sensor scan signals to the remaining first-sensor scan lines in the touch sensing mode.

In an exemplary embodiment, the second sensor scan driver 110B may sequentially supply the first sensor scan signals to the remaining first-sensor scan lines SSA1, SSA2, SSA4, SSA5, SSA7, and SSA8 other than the third, sixth, and ninth first-sensor scan lines SSA3, SSA6, and SSA9, for example.

In this case, output currents Io (refer to FIG. 6) may be provided from the sensor pixels SP in first, fourth, and seventh sensor pixel rows to the read-out circuit 120. Therefore, the read-out circuit 120 may sense a touch location using only the output currents Io, which are provided from the sensor pixels SP in the first, fourth, and seventh sensor pixel rows.

Referring to FIG. 14, the read-out circuit 120 may sense a touch location using some of output currents Io, which are provided from the first to eighth output lines O1 to O8, in order to rapidly sense a touch location in a touch sensing mode.

In an exemplary embodiment, the read-out circuit 120 may sense a touch location using only the output currents Io (refer to FIG. 6), which are provided from the first output line O1, the second output line O2, the seventh output line O7, and the eighth output line O8, for example.

If the first sensor scan driver 110A' provides first sensor scan signals only to the first, second, fourth, fifth, seventh and eighth first-sensor scan lines SSA1, SSA2, SSA4, SSA5, SSA7, and SSA8, the read-out circuit 120 may be provided with the output currents from the sensor pixels SP in first, second, seventh and eighth sensor pixel rows.

Here, since the read-out circuit 120 uses only the output currents Io, which are provided from the first output line O1, the second output line O2, the seventh output line O7, and the eighth output line O8, an active region in which a touch may be sensed may be set to sensor pixels SP indicated by hatched patterns, as shown in FIG. 14.

In this way, the read-out circuit 120 according to the exemplary embodiment of the invention uses only some of output currents Io, which are provided from the first to eighth output lines O1 to O8, so that the number of operations desired to calculate the touch location may be reduced, and thus a touch location may be rapidly sensed.

In accordance with the touch sensor and the display device including the touch sensor according to exemplary embodiments of the invention, a fingerprint may be sensed using all of sensor pixels or, alternatively, a touch location may be sensed using some of the sensor pixels, depending on the scheme for supplying sensor scan signals.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the invention as set forth in the following claims.

What is claimed is:

1. A touch sensor, comprising:
   sensor pixels which receive sensor scan signals and provide output currents which change in response to a touch made by a user;
   a sensor scan driver coupled to the sensor pixels through sensor scan lines and supplies the sensor scan signals to the sensor pixels through the sensor scan lines; and
   a read-out circuit coupled to the sensor pixels through output lines, and senses the touch using the output currents,
   wherein the sensor scan driver changes a scheme for supplying the sensor scan signals depending on a fingerprint sensing mode and a touch sensing mode,
   wherein a voltage change of each of the sensor scan signals applied to the sensor scan lines in the fingerprint sensing mode has a value greater than that of a voltage change of each of the sensor scan signals applied to the sensor scan lines in the touch sensing mode,
   wherein, among the sensor pixels, a sensor pixel coupled to an i-th (where i is an integer of 2 or more) sensor scan line of the sensor scan lines and j-th (where j is a natural number) output line of the output lines comprises:
   sensor electrode;
   a first transistor which includes a gate electrode coupled to the sensor electrode and controls a current which is output through the j-th output line;
   second transistor which includes a gate electrode coupled to the i-th sensor scan line, and is coupled between a reference voltage line and the first transistor; and
   a capacitor electrode which forms a first capacitor with the sensor electrode, and is coupled to the i-th sensor scan line, and
   wherein the sensor pixel further comprises a third transistor which includes a gate electrode coupled to an i−1-th sensor scan line and is coupled between the reference voltage line and the sensor electrode.

2. The touch sensor according to claim 1, wherein:
   the sensor scan driver comprises a first sensor scan driver and a second sensor scan driver,
   the first sensor scan driver supplies first sensor scan signals of the sensor scan signals to the sensor pixels in the fingerprint sensing mode, and
   the second sensor scan driver supplies second sensor scan signals of the sensor scan signals to the sensor pixels in the touch sensing mode.

3. The touch sensor according to claim 2, wherein the first sensor scan driver sequentially supplies the first sensor scan signals to respective sensor pixel rows of the sensor pixels.

4. The touch sensor according to claim 2, wherein the second sensor scan driver simultaneously supplies the second sensor scan signals to at least two of the sensor pixel rows of the sensor pixels.

5. The touch sensor according to claim 1, wherein a first period during which the fingerprint sensing mode is maintained is shorter than a second period during which the touch sensing mode is maintained.

6. The touch sensor according to claim 1, wherein a first period during which the fingerprint sensing mode is maintained and a second period during which the touch sensing mode is maintained are alternately repeated.

7. The touch sensor according to claim 1, wherein the read-out circuit senses a fingerprint using the output currents which are sequentially provided from the output lines in the fingerprint sensing mode.

8. The touch sensor according to claim 1, wherein the read-out circuit senses a touch location using a part of the output currents which are sequentially provided from the output lines in the touch sensing mode.

9. The touch sensor according to claim 1, wherein the sensor scan driver:
   sequentially supplies the sensor scan signals to the sensor scan lines in the fingerprint sensing mode, and
   supplies the sensor scan signals to only a part of the sensor scan lines in the touch sensing mode.

10. The touch sensor according to claim 1, wherein, when the touch is made, the sensor electrode forms a second capacitor with a finger of the user.

11. The touch sensor according to claim 10, wherein an output current of the output currents has a magnitude which varies in response to a change in capacitance of the second capacitor.

12. The touch sensor according to claim 10, wherein a gate voltage applied to the gate electrode of the first transistor is defined by the following equation:

$$Vg=Vcom+\{C1/(C1+C2)\}*Vs$$

where Vg denotes the gate voltage, Vcom denotes a reference voltage provided to the second transistor through the reference voltage line, C1 denotes capacitance of the first capacitor, C2 denotes capacitance of the second capacitor, and Vs denotes a change in voltage of a sensor scan signal supplied through the i-th sensor scan line.

13. A display device comprising:
   a display panel which displays an image; and
   a touch sensing layer disposed on a first surface of the display panel and including a touch sensor,
   wherein the touch sensor comprises:
   sensor pixels which provide output currents which change in response to a touch made by a user;
   a sensor scan driver which is coupled to the sensor pixels through sensor scan lines and supplies sensor scan signals to the sensor pixels; and
   a read-out circuit which is coupled to the sensor pixels through output lines, and senses the touch using the output currents,
   wherein the sensor scan driver changes a scheme for supplying the sensor scan signals depending on a fingerprint sensing mode and a touch sensing mode, and
   wherein, among the sensor pixels, a sensor pixel coupled to an i-th (where i is an integer of 2 or more) sensor scan line of the sensor scan lines and a j-th (where j is a natural number) output line of the output lines comprises:

a sensor electrode;

a first transistor which includes a gate electrode coupled to the sensor electrode and controls a current which is output through the j-th output line;

a second transistor which includes a gate electrode directly coupled to the i-th sensor scan line, and is coupled between a reference voltage line and the first transistor;

a capacitor electrode which forms a first capacitor with the sensor electrode, and is coupled to the i-th sensor scan line; and a third transistor which includes a gate electrode directly coupled to an i–1-th sensor scan line and is coupled between the reference voltage line and the sensor electrode.

14. The display device according to claim 13, wherein the sensor scan driver:

sequentially supplies the sensor scan signals to the sensor scan lines in the fingerprint sensing mode, and supplies the sensor scan signals to only a part of the sensor scan lines in the touch sensing mode.

15. The display device according to claim 13, wherein the read-out circuit:

senses a fingerprint using the output currents which are sequentially provided from the output lines in the fingerprint sensing mode, and senses a touch location using a part of the output currents which are sequentially provided from the output lines in the touch sensing mode.

16. The display device according to claim 13, wherein:

when the touch is made, the sensor electrode forms a second capacitor with a finger of the user, and an output current of the output currents has a magnitude which varies in response to a change in capacitance of the second capacitor.

* * * * *